United States Patent
Chin et al.

(10) Patent No.: US 10,610,953 B2
(45) Date of Patent: Apr. 7, 2020

(54) SYSTEMS AND METHODS FOR PROVIDING POWER FOR PLASMA ARC CUTTING

(71) Applicant: Hypertherm, Inc., Hanover, NH (US)

(72) Inventors: Wayne Chin, Etna, NH (US); Girish R. Kamath, Lebanon, NH (US); Norman LeBlanc, Claremont, NH (US); Christopher S. Passage, Sunapee, NH (US); Shane M. Selmer, Ascutney, VT (US)

(73) Assignee: Hypertherm, Inc., Hanover, NH (US)

( * ) Notice: Subject to any disclaimer, the term of this patent is extended or adjusted under 35 U.S.C. 154(b) by 350 days.

(21) Appl. No.: 15/486,257

(22) Filed: Apr. 12, 2017

(65) Prior Publication Data
US 2017/0291245 A1    Oct. 12, 2017

Related U.S. Application Data

(60) Provisional application No. 62/321,475, filed on Apr. 12, 2016.

(51) Int. Cl.
| | | |
|---|---|---|
| *B23K 10/00* | (2006.01) | |
| *H05H 1/36* | (2006.01) | |
| *H05H 1/46* | (2006.01) | |

(52) U.S. Cl.
CPC .......... *B23K 10/006* (2013.01); *B23K 10/00* (2013.01); *H05H 1/36* (2013.01); *H05H 2001/4682* (2013.01)

(58) Field of Classification Search
CPC ........ B23K 10/006; B23K 10/00; H05H 1/26; H05H 1/36; H05H 2001/4682

USPC ....... 219/121.44, 121.39, 121.54, 121.57, 75
See application file for complete search history.

(56) References Cited

U.S. PATENT DOCUMENTS

| | | | | |
|---|---|---|---|---|
| 4,270,165 A | * | 5/1981 | Carpenter | H02J 1/102 307/58 |
| 7,247,814 B2 | * | 7/2007 | Ott | B23K 9/0953 219/132 |
| 8,350,182 B2 | * | 1/2013 | Shipulski | B23K 10/02 219/121.39 |
| 9,550,251 B2 | * | 1/2017 | Gullotta | B23K 10/006 |

(Continued)

FOREIGN PATENT DOCUMENTS

WO    2014018299 A2    1/2014

*Primary Examiner* — Mark H Paschall
(74) *Attorney, Agent, or Firm* — Proskauer Rose LLP

(57) ABSTRACT

A plasma cutting system includes a plasma torch having a head, and a housing. A power supply is disposed within the housing and is in communication with the plasma torch. The power supply is configured to provide an output current for generating and maintaining a plasma cutting arc by the plasma torch, and includes a control processor in communication with a plurality of autonomous switching circuits via a multi-node communications bus. Each of the autonomous switching circuits includes a microcontroller configured to control the generation of a portion of the output current based on messages received from the control processor, monitor operating parameters of the autonomous switching circuit, and modify a control parameter of the autonomous switching circuit independent of and asynchronous to the other autonomous switching circuits of the plurality of autonomous switching circuits when one or more of the operating parameters exceeds a predetermined threshold.

18 Claims, 5 Drawing Sheets

(56) References Cited

U.S. PATENT DOCUMENTS

| | | | | |
|---|---|---|---|---|
| 9,931,708 B2* | 4/2018 | Salsich | ................ | B23K 10/006 |
| 9,967,964 B2* | 5/2018 | Kim | ........................ | H05H 1/28 |
| 2008/0093347 A1* | 4/2008 | Yamaguchi | .............. | H05H 1/36 |
| | | | | 219/121.54 |
| 2011/0155703 A1* | 6/2011 | Winn | ................... | B23K 9/1075 |
| | | | | 219/121.54 |

* cited by examiner

400

405 receiving, by microcontrollers of each of a plurality of autonomous switching circuits, first one or more messages from one or more control processors, the first one or more messages comprising current setpoints for each of the plurality of autonomous switching circuits

410 transmitting, by the microcontrollers of each of the plurality of autonomous switching circuits, second one or more messages to the one or more control processors, the second one or more messages acknowledging receipt of the current setpoints

415 controlling, by the microcontrollers of each of the plurality of autonomous switching circuits, the generation of a portion of the output current by each of the plurality of autonomous switching circuits based on the current setpoints

420 monitoring, by the microcontrollers of each of the plurality of autonomous switching circuits, one or more operating parameters of the autonomous switching circuits

425 modifying, by the microcontrollers of each of the plurality of autonomous switching circuits, a control parameter of the autonomous switching circuits independent of and asynchronous to the other autonomous switching circuits of the plurality of autonomous switching circuits when one or more of the operating parameters exceeds a predetermined threshold

- 505 selecting, by microcontrollers of each of the plurality of autonomous switching circuits, based on a predetermined selection scheme, a master microcontroller for coordinating operation of the plurality of autonomous switching circuits

- 510 determining, by the master microcontroller, one or more parameters for a process to be performed by the plasma arc system

- 515 receiving, by the master microcontroller, from each of the other microcontrollers of the plurality of autonomous switching circuits, first one or more messages comprising at least one attribute of the autonomous switching circuits

- 520 transmitting, by the master microcontroller, to each of the other microcontrollers of the plurality of autonomous switching circuits, second one or more messages comprising a current setpoint for each microcontroller, wherein each current setpoint is based on the at least one attribute of each autonomous switching circuit

- 525 controlling, by the microcontrollers of each of the plurality of autonomous switching circuits, based on the current setpoints, generation of a portion of an output current from the plasma arc system power supply

- 530 monitoring, by the microcontrollers of each of the plurality of autonomous switching circuits, one or more operating parameters of the autonomous switching circuits

- 535 modifying, by the microcontrollers of each of the plurality of autonomous switching circuits, a control parameter of the autonomous switching circuits independent of and asynchronous to the other autonomous switching circuits of the plurality of autonomous switching circuits when one or more of the operating parameters exceeds a predetermined threshold

FIG. 5

SYSTEMS AND METHODS FOR PROVIDING POWER FOR PLASMA ARC CUTTING

CROSS REFERENCE TO RELATED APPLICATIONS

This application claims the benefit of and priority under 35 U.S.C. §119(e) to U.S. Provisional Patent Application No. 62/321,475, filed. Apr. 12, 2016, which is incorporated by reference herein in its entirety.

TECHNICAL FIELD

This application relates generally to plasma arc cutting systems. In particular, the application relates to systems and methods for providing an output current from a power supply for generating and maintaining a plasma cutting arc by a plasma torch.

BACKGROUND

Existing plasma arc cutting systems (e.g., systems using a plasma arc for cutting, marking, and gouging of materials) use a digital signal processor ("DSP") or micro-controller for controlling power supply circuits that generate the current necessary or desirable for a specific application. Power sources typically receive a high voltage alternating current ("VAC") signal and provide a high current output for plasma arc cutting or marking. Power supplies for plasma arc systems receive such inputs and produce a high current DC output of approximately 10-400 amperes for use as plasma arc cutting output.

Existing plasma arc cutting systems are not scalable and therefore use many different power supply designs to support various output current requirements. For example, the current output generated by a high-capacity power supply may not have desirable properties for performing lower current operations, necessitating procurement of two different plasma arc cutting systems to be able to perform all desired operations.

Further, in existing plasma arc cutting systems that employ a power supply having multiple power conversion circuits, those power conversion circuits must be configured, monitored and managed by a central DSP or microcontroller, and cannot operate independently of each other due to the processing overhead associated with their operation.

The physical architecture of existing plasma arc cutting systems inhibits effective plasma current control, decreases system reliability, and further, increases component requirements, system size and weight, manufacturing costs, and the potential for faulty components.

SUMMARY

Accordingly, there is a need for improved systems and methods for providing an output current from a power supply for generating and maintaining a plasma cutting arc by a plasma torch.

In one aspect, a plasma cutting system is featured including a housing, a power supply disposed within the housing and configured to provide an output current for generating and maintaining a plasma arc by a torch head. The power supply includes one or more control processors. The power supply also includes a plurality of autonomous switching circuits in communication with the one or more control processors. Each of the plurality of switching circuits includes a microcontroller configured to control the generation of a portion of the output current. The power supply further includes a plasma torch connected to the power supply to produce the plasma arc.

In another aspect, a plasma cutting system is featured, including a plasma torch having a head, and a housing. A power supply is disposed within the housing and is in communication with the plasma torch. The power supply is configured to provide an output current for generating and maintaining a plasma cutting arc by the plasma torch. The power supply includes one or more control processors and a plurality of autonomous switching circuits in communication with the one or more control processors via a multi-node communications bus. Each of the plurality of autonomous switching circuits includes a microcontroller configured to control the generation of a portion of the output current based on one or more messages received from the one or more control processors, monitor one or more operating parameters of the autonomous switching circuit, and modify a control parameter of the autonomous switching circuit independent of and asynchronous to the other autonomous switching circuits of the plurality of autonomous switching circuits when one or more of the operating parameters exceeds a predetermined threshold.

In another aspect, a method of providing an output current from a power supply for generating and maintaining a plasma cutting arc by a plasma torch is featured. The microcontrollers of each of a plurality of autonomous switching circuits receive first one or more messages from one or more control processors. The first one or more messages include current setpoints for each of the plurality of autonomous switching circuits. The microcontrollers of each of the plurality of autonomous switching circuits transmit second one or more messages to the one or more control processors. The second one or more messages acknowledge receipt of the current setpoints. The microcontrollers of each of the plurality of autonomous switching circuits control the generation of a portion of the output current by each of the plurality of autonomous switching circuits based on the current setpoints. The microcontrollers of each of the plurality of autonomous switching circuits monitor one or more operating parameters of the autonomous switching circuits. The microcontrollers of each of the plurality of autonomous switching circuits modify a control parameter of the autonomous switching circuits independent of and asynchronous to the other autonomous switching circuits of the plurality of autonomous switching circuits when one of the operating parameters exceeds a predetermined threshold.

In another aspect, a method of providing an output current from a plasma arc system power supply comprising a plurality of autonomous switching circuits is featured. Based on a predetermined selection scheme, the microcontrollers of each of the plurality of autonomous switching circuits select a master microcontroller for coordinating operation of the plurality of autonomous switching circuits. The master microcontroller determines one or more parameters for a process to be performed by the plasma arc system. The master microcontroller receives from each of the other microcontrollers of the plurality of autonomous switching circuits, first one or more messages comprising at least one attribute of the autonomous switching circuits. The master microcontroller transmits to each of the other microcontrollers of the plurality of autonomous switching circuits, second one or more messages including a current setpoint for each microcontroller, wherein each current setpoint is based on the at least one attribute of each autonomous switching circuit. Based on the current setpoints, the microcontrollers of each of the plurality of autonomous switching circuits control generation of a portion of an output current from the plasma arc system power supply. The microcontrollers of each of the plurality of autonomous switching circuits monitor one or more operating parameters of the autonomous switching circuits. The microcontrollers of each of the plurality of autonomous switching circuits modify a control parameter of the autonomous switching circuits independent of and asynchronous to the other autonomous switching circuits of the plurality of autonomous switching circuits when one or more of the operating parameters exceeds a predetermined threshold.

The above aspects can include one or more of the following features. In some embodiments, the plasma cutting system further includes a plurality of transmission line termination resistors connected between the plurality of autonomous switching circuits and the one or more control processors. In some embodiments, the set of transmission line termination resistors is positioned at distal ends of the multi-node communications bus or at a common connection node of the multi-node communications bus.

In some embodiments, a control board is disposed within the housing, and the control board includes the one or more control processors and a connector associated with the multi-node communications bus. In some embodiments, each microcontroller is a Digital Signal Processor (DSP).

In some embodiments, each of the plurality of autonomous switching circuits comprises a unique identifier. In some embodiments, the unique identifier of an autonomous switching circuit of the plurality of autonomous switching circuits is based on one or more of (i) a physical location of the autonomous switching circuit within the housing, (ii) a key installed on the autonomous switching circuit, (iii) DIP switch settings, or (iv) one or more jumpers installed on the autonomous switching circuit. In some embodiments, operation of an autonomous switching circuit is enabled or disabled based on a value of its unique identifier.

In some embodiments, the multi-node communications bus includes a multi-drop topology in which the one or more control processors are connected in parallel to the plurality of autonomous switching circuits.

In some embodiments, the one or more operating parameters include at least one of a DC voltage, a temperature of an autonomous switching circuit, and a current. In some embodiments, each microcontroller is further configured to monitor the one or more operating parameters in real time.

In some embodiments, each microcontroller is further configured to detect one or more of a single-phase fault or an over-load current fault, modify a control parameter of the switching circuit independent of and asynchronous to the other autonomous switching circuits of the plurality of autonomous switching circuits based on the fault, and provide an indication of the fault to the one or more control processors. In some embodiments, the indication of the fault is provided to the one or more control processors in one or more messages transmitted via the multi-node communications bus.

In some embodiments, the multi-node communications bus is configured to support at least one of Controller Area Network (CAN) protocol, CANOpen protocol, Ethernet for Control Automation Technology (EtherCAT) protocol, DeviceNET protocol, or SERCOS protocol.

In some embodiments, the one or more control parameters comprise a frequency of a pulse wave modulated (PWM) signal, a duty cycle of a PWM signal, a timing signal for plasma arc ignition, and a shutdown signal. In some embodiments, the one or more messages received from the one or more control processors comprise a setpoint for a current reference of the autonomous switching circuit. In some embodiments, the setpoint corresponds to a profile relating gas pressure and time during one of a critical ramp-up period, a steady state period, or a ramp-down period.

In some embodiments, each of the plurality of autonomous switching circuits generates an equal portion of the output current. In some embodiments, at least two of the plurality of autonomous switching circuits generate a different portion of the output current. In some embodiments, the portion of the output current generated by an autonomous switching circuit is based on one or more of a number of hours the autonomous switching circuit has been operated, a location of the autonomous switching circuit within the housing, a type of plasma cutting operation being performed by the plasma cutting system, a stage of a plasma cutting operation being performed by the plasma cutting system, and a current generation capability of the autonomous switching circuit. In some embodiments, the portion of the output current generated by an autonomous switching circuit is based on one or more of a type of plasma marking operation being performed by the plasma cutting system and a stage of a plasma marking operation being performed by the plasma cutting system, and a current generation capability of the autonomous switching circuit.

BRIEF DESCRIPTION OF THE DRAWINGS

The advantages of the systems and methods described above, together with further advantages, may be better understood by referring to the following detailed description taken in conjunction with the accompanying drawings. The drawings are not necessarily to scale, emphasis instead generally being placed upon illustrating the principles of the described embodiments by way of example only.

FIG. 4 is a flow diagram of a method for providing an output current from a power supply for generating and maintaining a plasma cutting arc by a plasma torch, in accordance with embodiments described herein.

FIG. 5 is a flow diagram of a method of providing an output current from a plasma arc system power supply comprising a plurality of autonomous switching, in accordance with embodiments described herein.

DETAILED DESCRIPTION

The systems and methods described herein relate to a plasma arc cutting system capable of providing an output current from a power supply for generating and maintaining a plasma cutting arc by a plasma torch. The system generates output current using one or more switching circuits, and its output can be scaled by adding additional switching circuits to the power supply as needed. Each switching circuit includes a microcontroller to configure, monitor, and manage its operation autonomously from other switching circuits in the system. For example, upon receipt of a single command indicating the desired current output at the start of operation, the switching circuit configures its power conversion circuits for operation, monitors parameters of its operation critical to generating current, and manages itself to maintain the current output at the desired level. Each autonomous switching circuit operates independently from and performs its functions asynchronously from the other autonomous switching circuits in the system.

Figure 1:
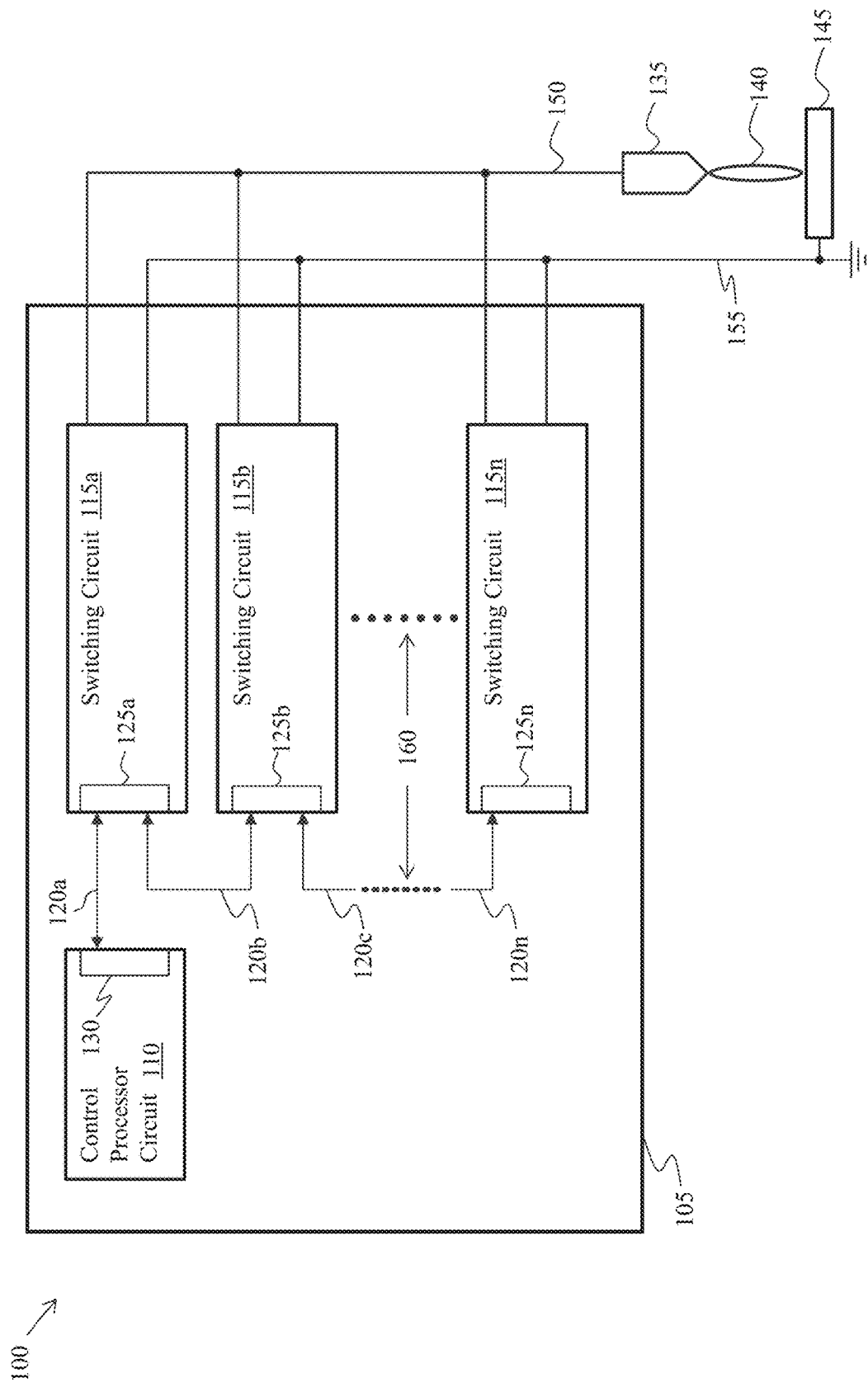
FIG. 1 is a block diagram of an exemplary system, in accordance with embodiments described herein.

FIG. 1 is a block diagram of a plasma cutting system 100 in accordance with embodiments of the systems and methods described herein. System 100 includes power supply 105 in electrical communication with plasma torch 135 and workpiece 145. Power supply 105 is configured to provide an output current to plasma torch 135 via output 150 for generating and maintaining a plasma cutting arc 140 for cutting or marking a workpiece 145. Workpiece 145 is in electrical communication with power supply 105 via common 155. As depicted in FIG. 1, common 155 is connected to electrical ground. In some embodiments, common 155 is connected to a voltage potential other than electrical ground that is lower or higher than the voltage potential applied to plasma torch 135.

Power supply 105 includes control processor circuit 110 and a plurality of switching circuits 115 mounted within one or more housings (not shown). For example, control processor circuit 110 and the plurality of switching circuits 115 can each comprise a printed circuit board populated with active and passive components, and mounted within one or more sheet metal housings with fasteners or latches.

As depicted in FIG. 1, the plurality of switching circuits 115 comprises switching circuit 115a, switching circuit 115b and switching circuit 115n. However, ellipses 160 denote that power supply 105 can include any number of switching circuits. In some embodiments, power supply 105 includes one or two switching circuits.

Control processor circuit 110 includes bus interface 130 that provides a connection interface for connecting to multi-node communications bus 120, comprised of bus segment 120a, bus segment 120b, bus segment 120c and bus segment 120n. As with the switching circuits described above, ellipses 160 denote that there can be any number of bus segments.

Each of the plurality of switching circuits 115 includes a bus interface 125 (e.g., 125a, 125b and 125n) that provides a connection point for connecting to multi-node communications bus 120. Multi-node communications bus 120 can be formed by connecting control processor circuit 110 and the plurality of switching circuits 115 in series (e.g., "daisy-chaining" them). For example, bus interface 125a can include two connectors (e.g., a male connector and a female connector), and bus segment 120a can be formed by connecting a cable (e.g., coaxial cable) or wiring harness between a connector at bus interface 130 and a male connector of bus interface 125a. Further, bus interface 125b can include two connectors (e.g., a male connector and a female connector), and bus segment 120b can be formed by connecting a cable or wiring harness between a female connector of bus interface 125a and a male connector of bus interface 125b. Each of the other bus segments 120 can be formed by continuing to daisy-chain additional switching circuits 115 together in the same manner. This connection scheme for the multi-node communications bus 120 is advantageous because the control processor circuit 110 is only required to have a single connector for accessing switching circuits 115, regardless of how many switching circuits 115 are added to power supply 105.

In some embodiments, multi-node communications bus 120 is the medium used to implement the Controller Area Network ("CAN") bus protocol for facilitating communications between control processor circuit 110 and the plurality of switching circuits 115. In some embodiments, multi-node communications bus 120 is configured to support one or more of the CANopen protocol, the Ethernet for Control Automation Technology ("EtherCAT") protocol, the DeviceNet protocol, or the serial real-time communication system ("SERCOS") automation bus protocol.

Control processor circuit 110 includes a control processor (e.g., microprocessor, microcontroller, DSP, field-programmable gate array, complex programmable logic device, etc.) and is programmed for managing operation of power supply 105. In some embodiments, control processor circuit 110 includes supporting logic and other components (e.g., volatile and non-volatile memory, a wireless communications module, one or more communications PHYs, sensors, etc.) that operate in conjunction with the processor for managing operation of power supply 105. In some embodiments, the processor is in communication with a computer numerical control ("CNC") device (not shown) via an EtherCAT interface, and the CNC device manages a cutting or marking operation being performed by system 100. In some embodiments, control processor circuit 110 includes a plurality of control processors.

Figure 2:
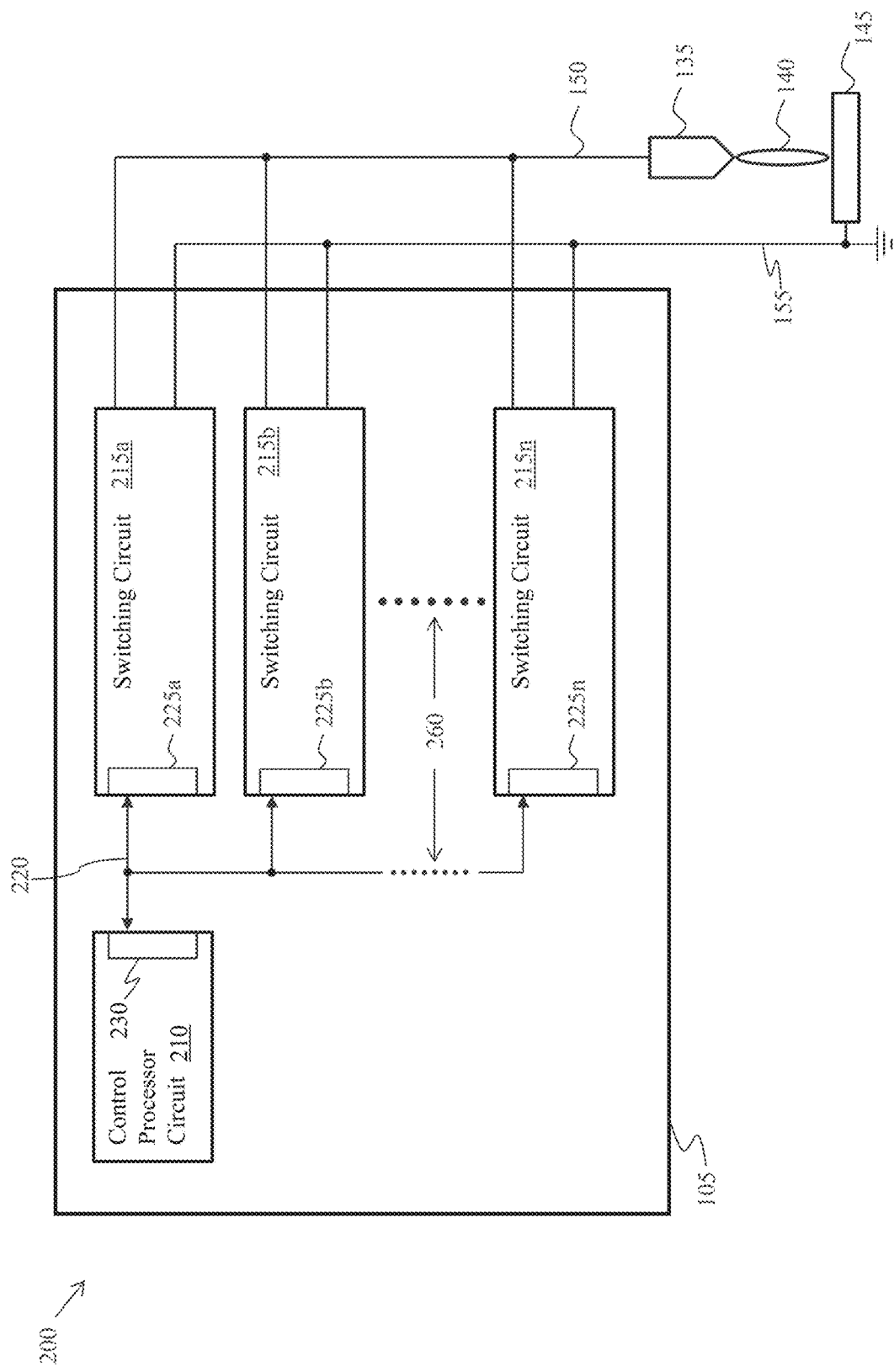
FIG. 2 is a block diagram of an exemplary system, in accordance with embodiments described herein.

FIG. 2 is a block diagram of a plasma cutting system 200 in accordance with embodiments of the systems and methods described herein. System 200 includes substantially similar components to system 100. However, in lieu of a serial, daisy-chained implementation of multi-node communications bus 120, the multi-node communications bus 220 of system 200 is implemented as a parallel connection between bus interface 230 of control processor 210 and bus interfaces 225 of the plurality of switching circuits 215.

Figure 3:
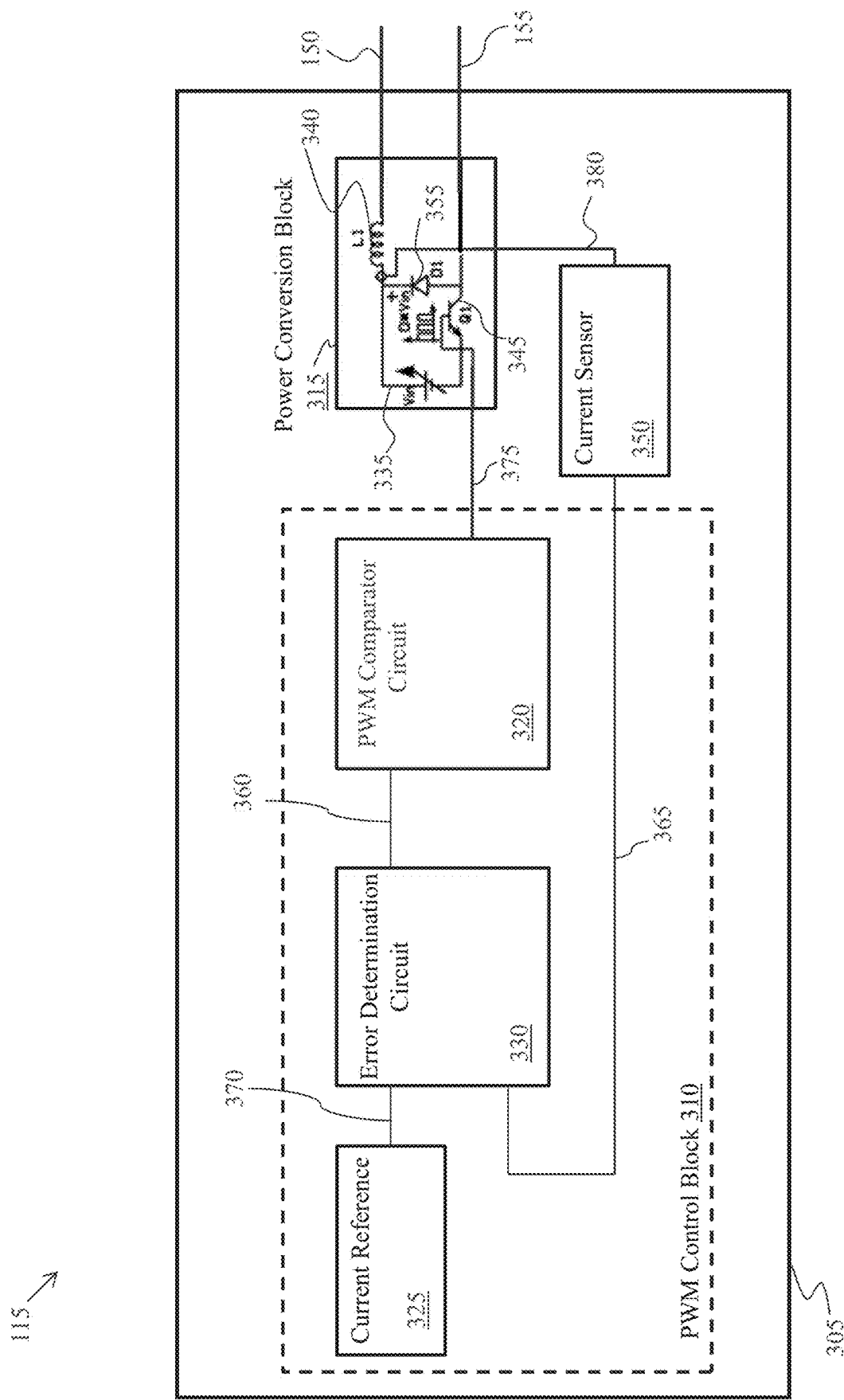
FIG. 3 is a block diagram of an exemplary switching circuit, in accordance with embodiments described herein.

FIG. 3 is a block diagram of an exemplary switching circuit 115, in accordance with the systems and methods described herein. Switching circuit 115 includes printed circuit board ("PCB") 305, pulse-width modulation ("PWM") control block 310 (shown with dashed lines), power conversion block 315 and current sensor 350. Current sensor 350 can be any active or passive device used for measuring or quantifying the flow of current. In some embodiments, current sensor 350 is a current sense, or "shunt" resistor mounted to PCB 305. In some embodiments, current sensor 350 is a Hall-effect current sensor device. In some embodiments, current sensor 350 is mounted to a metal plate attached to the one or more housings of power supply 105 and is connected to PCB 305 using wires and lugs.

PWM control block 310 includes current reference 325, error determination circuit 330 and PWM comparator circuit 320. PWM comparator circuit 320 includes a microcontroller or other type of processor (e.g., microprocessor, digital signal processor ("DSP"), field-programmable gate array, complex programmable logic device, etc.) and supporting logic and other components (e.g., volatile and non-volatile memory, a wireless communications module, one or more communications PHYs, sensors, etc.) that operate in conjunction with the microcontroller. In some embodiments, the microcontroller is a Texas Instruments TMS320LF2407A or similar DSP device from the C2000 family of products. In some embodiments, the microcontroller is an STMicroelectronics STM32F405 or similar device with an ARM microcontroller core.

Error determination circuit 330 is configured to monitor the output current being provided by switching circuit 115 and produce error output 360 based on a comparison of measured output current signal 365 with a current setpoint 370 output from current reference 325 which is indicative of a desired output current. For example, measured output current signal 365 and current setpoint 370 can each be analog voltages that are compared to determine an error output 360, wherein the magnitude of error output 360 is dependent on the difference between output current signal 365 and current setpoint 370. In some embodiments, current reference 325 is a programmable current reference device in electrical communication with a management interface of the microcontroller, and current reference 325 can be programmed by the microcontroller to modify the value of current setpoint 370. In some embodiments, current reference 325 is implemented as discrete analog components, and the value of current setpoint 370 can be modified by adjusting the voltage of an Analog-to-Digital Converter ("ADC") output pin of the microcontroller in electrical communication with the current reference 325 circuitry.

In some embodiments, error determination circuit 330 is implemented as an operational amplifier with supporting components, and is configured to generate an error output 360 that varies according to a difference between measured output current signal 365 and current setpoint 370. In some embodiments, PWM comparator circuit 320 receives measured output current signal 365 and current setpoint 370, and error determination circuit 330 is implemented in the circuitry and software of PWM comparator circuit 320.

Based on the implementation of error determination circuit 330, PWM comparator circuit 320 receives error output 360 at an ADC interface input or the microcontroller of PWM comparator circuit 320 calculates the error in software and determines a value for error output 360 using internal logic. The microcontroller uses appropriate internal peripherals to produce a triangular carrier wave at a predetermined frequency (e.g., 15 kHz) and generates PWM pulse train 375 based on a comparison of the carrier wave to the value of error output 360. PWM pulse train 375 is provided to power conversion block 315.

Power conversion block 315 includes voltage input ("Vin") 335, inductor 340, insulated-gate bipolar transistor ("IGBT") 345 and diode 355, arranged in a chopper or buck converter configuration. IGBT 345 can include a heatsink. In some embodiments, power conversion block 315 includes more than one IGBT based on considerations such as required current output, geometry requirements of the power supply 105, and thermal properties of the IGBT.

Vin 335 is a DC voltage rectified from an AC input. In some embodiments, power conversion block 315 includes diodes for full-wave rectifying a three-phase AC input voltage to create Vin 335. PWM pulse train 375 is connected to the gate of IGBT 345 and is used to turn IGBT 345 on and off according to the duty cycle of PWM pulse train 375 to control the output current provided from power conversion block 315. For example, the duration of time that IGBT 345 is turned on and off, and the corresponding amount of current that is provided at the output of switching circuit 115, is based on the duty cycle of PWM pulse train 375. The output waveform generated from the operation of PWM pulse train 375 on IGBT 345 is filtered by inductor 340 resulting in a DC output with minimal ripple. Based on the current that is provided at the output of switching circuit 115 and the plasma arc characteristics (e.g., one or more gas types, one or more gas flow rates, one or more gas swirls), a voltage potential is created across output 150 and common 155, which are electrically connected to power conversion block 315 with wires or bus bars. For example, the plasma arc characteristics in conjunction with the current conducted through the plasma arc produces a voltage drop (e.g., arc voltage). In some embodiments, properties of the arc voltage are used to determine the torch height above the workpiece. The torch height information is in turn used to obtain an optimum cut surface that will be as square (e.g., at a right angle to the workpiece surface) as possible. In some embodiments, the one or more processors or the microcontroller estimate the plasma arc voltage using techniques described in U.S. application Ser. No. 11/602,047, entitled "Arc voltage estimation and use of arc voltage estimation in thermal processing systems," which is hereby incorporated by reference in its entirety.

Output current is sensed at point 380 by current sensor 350 and fed back to error determination circuit 330 as described above for error calculation and adjustment of the resulting PWM pulse train 375 by the microcontroller to maintain the output current at the level indicated by current reference 325. For example, if the microcontroller determines the current being provided is less than the desired current output, the positive duty cycle of PWM pulse train 375 increases, i.e., the duration of time that the PWM pulse train 375 signal is in the "on" or "active" state during a given period of the PWM signal is increased with respect to the duration of time that the PWM pulse train 375 signal is in the "off" or "inactive" state. Conversely, if the microcontroller determines the current being provided is more than the desired current output, the negative duty cycle of PWM pulse train 375 increases, i.e., the duration of time that the PWM pulse train 375 signal is in the "off" or "inactive" state during a given period of the PWM signal is increased with respect to the duration of time that the PWM pulse train 375 signal is in the "on" or "active" state.

In some embodiments, each switching circuit 115 includes sensors for measuring one or more of the DC input bus voltage (e.g., the voltage of Vin 335), the voltage being applied to torch 135, and the temperature at one or more locations of the switching circuit 115 (e.g., the case of the microcontroller, the heatsink of the IGBT). The output or value of the sensors can be interpreted or read by the microcontroller on the switching circuit 115, and the measurements can be stored within the microcontroller on in an on-board data storage device in communication with the microcontroller.

Although the configuration and operation of power conversion block 315 has been described with respect to a particular embodiment, it should be appreciated that other power converter topologies can be implemented without departing from the spirit of the technology described herein. In some examples, switching circuit 115 is a PCB that includes a single instantiation of PWM control block 310 that is in electrical communication with, and controls, two separate instances of each of current reference 325, error determination circuit 330, power conversion block 315 and current sensor 350. In these examples, the outputs of each instance can be controlled independently and asynchronously. In some embodiments, the PWM control block 310 controls the outputs of each instance such that their PWM signal waveforms are 180 degrees out of phase for minimizing ripple in the output of power supply 105.

In some examples, in order to minimize output ripple, the plurality of switching circuits 115 are configured to generate their outputs such that they are out of phase with one another. In one embodiment, the microcontroller of each switching circuit 115 receives an instance of a common, phase-aligned clock. The clock can be distributed from control processor circuit 110 via connections similar to those implemented for multi-node communications bus 120. In some embodiments, control processor circuit 110 provides a clock to switching circuit 115*a*, and switching circuit 115*a* provides a buffered, phase-shifted version of the clock to switching circuit 115*b*, and so on for each daisy-chained switching circuit 115. In some embodiments, the clock is encoded such that each switching circuit 115 can take a sync signal from the clock and determine an appropriate phase shift to apply to its PWM output (e.g., PWM pulse train 375) according to the configuration of system 100. For example, if system 100 includes two switching circuits 115, the outputs are shifted to be 180 degrees out of phase with one another. If system 100 includes three switching circuits 115, the outputs are shifted to be 120 degrees out of phase with one another, and so on. In some embodiments, a switching circuit 115 determines the appropriate phase shift to apply to its output based on its unique identifier, described in detail below.

Additional features and components of system 100 will be described in reference to FIG. 4, which shows a flow diagram for a method 400 of providing an output current from a power supply for generating and maintaining a plasma cutting arc by a plasma torch.

Each microcontroller of the plurality of switching circuits 115 receives (405) first one or more messages from one or more control processors, the first one or more messages including current setpoints for each plurality of switching circuits 115. For example, a control processor of control processor circuit 110 can generate one or more messages formatted for the CAN protocol that include current setpoint data included with commands to instruct switching circuit 115a to program its current reference 325 to provide a particular current setpoint 370. The control processor can determine the current setpoint data indicating the value or voltage level of current setpoint 370 based on the total current required for a cutting or marking operation being performed with the plasma cutting system divided by the number of switching circuits 115 available to share the output current load (e.g., equal current-sharing). The control processor transmits the first one or more messages over multi-node communications bus 120 via bus interface 130, and the microcontroller on switching circuit 115a receives the messages via bus interface 125a.

In some embodiments, the setpoint sent by the one or more controllers is based on a profile relating gas pressure and time during a particular period of time that the cutting system power supply 105 is operated such as a critical ramp-up period, a steady state period, or a ramp-down period.

Substantially similar operations are carried out for the control processor to transmit setpoint data included with commands to instruct switching circuit 115b through switching circuit 115n to program their respective current references 325 to provide particular current setpoints 370.

The control processor is able to address messages to individual switching circuits 115, and the individual switching circuits 115 are able to determine which messages are intended to be received by them, based on unique identifiers assigned to each switching circuit 115. For example, the messages that are passed to and from the control processor and the microcontrollers of each switching circuit 115 include data indicating the value of the unique identifier.

In order to set the value of the unique identifier, each switching circuit 115 has a connector or other interface (e.g., card slot) for accepting an identification key. For example, the connector can include a plurality of pins, each of which is pulled to ground or a VCC voltage rail through a resistor to set the unique identifier to a default value when an identification key is not present. In one embodiment, the unique identifier includes four pins that are pulled to ground by default, setting its default value to zero. In another embodiment, the unique identifier includes four pins that are pulled to VCC by default, setting its default value to binary sixteen, or hexadecimal 0×F.

In some embodiments, when the unique identifier of a switching circuit 115 is set to the default value, the operation of the switching circuit 115 is disabled. In some embodiments, the microcontroller senses the voltage level of the pins of the unique identifier, and the microcontroller is programmed to hold its switching circuit 115 in a disabled state when the unique identifier is set to its default value. In another example, one or more of the unique identifier pins are connected to a reset input of the microcontroller, and the microcontroller is held in a reset state when the unique identifier is set to its default value which disables operation of the switching circuit 115. In some embodiments, when the unique identifier of a switching circuit 115 is set to the default value, the operation of the switching circuit 115 is enabled.

Each identification key includes the mating connector to the unique identifier connector on the switching circuits 115, and certain pins of each identification key are pulled to ground or to a VCC voltage rail. In some examples, the identification key is a wiring harness having certain pins of its connector wired to ground or to a VCC voltage rail. In some embodiments, the panels making up the one or more housings are grounded and the wires of the identification key are pulled to ground by fastening them to a panel of the one or more housings.

When the identification key is mated to the unique identifier connector of a switching circuit 115, the voltages of the identification key pins override the default values of the unique identifier pins to set a unique identifier. In some embodiments, the unique identifier comprises four pins, and using binary or hexadecimal encoding, fifteen unique identifiers can be assigned to the switching circuits 115 (e.g., fifteen unique identifiers and one default value). In a simpler implementation using four pins and no encoding, four unique identifiers can be assigned to the switching circuits 115 (e.g., one unique identifier value per pin of the connector, and one default value in which all pins are set to VCC or ground). In some embodiments, the unique identifier can be set by setting switch positions on a DIP switch located on each switching circuit 115. In some embodiments, the unique identifier can be set by installing one or more jumpers to the connector associated with the unique identifier that shunt the unique identifier signals to VCC or ground to set the value of the unique identifier.

In some embodiments, the value of the unique identifier indicates a physical location of a switching circuit 115 within the one or more housings of power supply 105. For example, in an embodiment of power supply 105 including up to four switching circuits 115, each switching circuit 115 is mounted in a different physical location within the one or more housings of power supply 105. Each of the four identification keys for setting a unique identifier of one of the switching circuits 115 is a wiring harness with wires having a fixed length that are fastened to a particular physical location in the one or more housings such that each identification key can be only be mated with the one switching circuit 115 that is within its proximity.

In some embodiments, the switching circuit 115 enters a self-test or diagnostic mode based on a certain value of the unique identifier.

In some embodiments, the identification keys include terminators for the transmission lines of multi-node communications bus 120. For example, the signal transmission lines on the switching circuit PCB that make up its bus interface can also be routed to the unique identifier connector such that when an identification key is mated to the unique identifier connector, a termination resistance or termination circuit is applied to the transmission lines. In some embodiments, the terminators are termination resistors connected between the plurality of switching circuits 115 and the one or more control processors, and the configuration and value of the resistors is dependent on one or more of the topology of the transmission lines in the PCB and the and the protocol implemented for the multi-node communications bus 120. In some embodiments, the termination resistors are located at the distal ends of multi-node communications bus 120. In some embodiments, the termination resistors are located at a common or shared connection node associated with the multi-node communications bus 120.

The microcontrollers of each of the plurality of switching circuits 115 transmit (410) second one or more messages to the one or more control processors, the second one or more messages acknowledging receipt of the current setpoints. In some embodiments, the second one or more messages also include values of one or more measurements (e.g., output current, output voltage applied to the torch 125, input bus voltage, temperature at one or more locations) obtained based on readings from sensors on the switching circuit 115. In some embodiments, the one or more control processors determine that a switching circuits 115 is not installed at a particular location or unique identifier if the switching circuits 115 does not acknowledge the first one or more messages within a predetermined timeout period.

The microcontrollers of each of the plurality of switching circuits 115 control (415) the generation of a portion of the output current by each of the plurality of autonomous switching circuits based on the current setpoints. Upon receipt of data including a current setpoint from the one or more control processors, the microcontroller programs current reference 325 accordingly and enables its PWM generation circuitry to begin generating output current for providing to torch 135. The microcontrollers of each of the plurality of switching circuits 115 each transmit one or more messages to the one or more control processors including a current measurement taken at their respective output. The one or more control processors of control processor circuit 110 sum the measured values from each switching circuit 115 to determine if the total output current being provided by power supply 105 matches the desired current output. In some embodiments, the summed measurements are filtered by the one or more control processors using averaging algorithms to normalize the summed result.

The microcontrollers of each of the plurality of switching circuits 115 monitor (420) one or more operating parameters of the switching circuits 115. For example, during current-generating operations, each microcontroller monitors one or more of the DC input bus voltage (e.g., the voltage of Vin 335), the voltage being applied to torch 135, and the measured output current signal 365. In some embodiments, each microcontroller monitors the temperature at one or more locations of the switching circuit 115 (e.g., the case of the microcontroller, the heatsink of IGBT 345). In some embodiments, each of the operating parameters is monitored in real time, allowing any required adjustments to the control parameters to be applied immediately to maintain stability at the output.

The microcontrollers of each of the plurality of switching circuits 115 modify (425) a control parameter of the switching circuits 115 independent of and asynchronous to the other switching circuits 115 of the plurality of switching circuits 115 when one of the operating parameters exceeds a predetermined threshold. For example, as described above, if the comparison of the measured output current signal 365 and current setpoint 370 results in an error output 360 that exceeds a certain threshold defined in the microcontroller, the microcontroller modifies a control parameter of its PWM generation circuitry to adjust the PWM pulse train 375, and in turn, the current output accordingly, as described above. In some embodiments, the control parameters include one or more of frequency of a PWM signal, a duty cycle of a PWM signal, a timing signal related to plasma arc ignition, and a shutdown signal triggering the cessation of current generation.

Throughout operation of system 100, the one or more control processors continue to issue data and commands to the switching circuits 115 with different time delays as needed to suit a particular plasma cutting process. For example as the current demands increase or decrease based on the cutting operation being performed, the messaging is repeated many times during the cut cycle. Further, updated current setpoints are sent during a cutting operation in order to follow a desired ramp-up, steady-state cutting operation, or ramp-down current profile stored on control processor circuit 110 or a CNC in communication with control processor circuit 110. In some embodiments, the time-critical ramp-up and ramp-down current profiles are sent from control processor circuit 110 to switching circuits 115 prior to the start of the cut cycle.

In some embodiments, the one or more control processors configure the plurality of switching circuits 115 to generate an equal share of the total required output current needed for a particular cutting or marking operation. In some embodiments, the one or more control processors configure the plurality of switching circuits 115 to generate different shares of the total required output current needed for a particular cutting or marking operation. For example, power supply 105 can include switching circuits 115 having different output current generation capacities (e.g., switching circuit 115a and switching circuit 115b are capable of generating 80 Å each, and switching circuit 115n is capable of generating 130 Å). Because the switching circuits 115 can be controlled independently, the configuration of system 100 advantageously enables the total current generated at the output of power supply 105 to be generated by "mixing and matching" switching circuits 115 having differing capabilities, if desired.

In some embodiments, the one or more control processors configure the plurality of switching circuits 115 to generate different shares of the total required output current needed for a particular cutting or marking operation based on the location of each switching circuit 115 within the one or more housings of power supply 105. For example, a switching circuit 115 located adjacent to a cooling fan or vent can be configured to generate a larger share of the total output current than a switching circuit 115 that is positioned in an area with little air flow to cool its components. As discussed above, the unique identifier of each switching circuit 115 can indicate its position or location within the power supply housing, and the one or more control processors can therefore determine the location of each switching circuit 115 based on a predefined profile of system 100 stored on control processor circuit 110 or a CNC in communication with control processor circuit 110.

In some embodiments, the one or more control processors configure the plurality of switching circuits 115 to generate different shares of the total required output current needed for a particular cutting or marking operation based on the number of hours that each switching circuit 115 has been operated. For example, switching circuits 115 that have been operated for a period of time that exceeds a threshold can be configured to provide a smaller share of the output current than switching circuits 115 that are "fresh" and have been operated for a period of time that does not exceed a threshold.

In some embodiments, the microcontroller of a switching circuit 115 sends one or more messages to the one or more control processors based on a temperature measurement exceeding a predetermined threshold. In response, the one or more control processors send messages to each of the switching circuits 115 to redistribute the required current generated by each switching circuit 115 such that less current is generated by the switching circuit 115 that sensed the over-temperature condition. In some examples, the microcontroller of a switching circuit 115 detects a single-phase fault or over-current fault based on sensor measurements. In response, the microcontroller modifies its control parameters to reduce its current output, or to cease generation of current if the fault is critical. Further, the microcontroller sends one or more messages to the one or more control processors to report the fault condition so the one or more control processors can adjust operation of the other switching circuits 115 accordingly, or shut down the cutting or marking operation.

In some embodiments, the one or more processors configure only a subset of the plurality of switching circuits 115 to generate current. In one example, to achieve a controlled start-up profile, only one switching circuit 115 is enabled until the current demand exceeds a threshold (e.g., 30 Å), and then other switching circuits 115 are configured to begin generating current to share the load. In some embodiments, power supply 105 is made up of switching circuits 115 having differing capabilities, and the one or more processors configure only a subset of the plurality of switching circuits 115 based on the operation being performed by system 100. For example, a first switching circuit 115 can have a low current output capacity with a highly accurate output (e.g., a low-current marking switching circuit 115 with an output capacity in the range of 5 Å to 30 Å), whereas a second switching circuit 115 can have a high current output with more variability in its output (e.g., a high-output switching circuit 115 with an output capacity in the range of 130 Å to 170 Å, and optimized for high speed and/or high thickness cutting). In such a scenario, the one or more processors can configure only the first switching circuit 115 to generate current for operations that require high accuracy but low current (e.g., marking), and the one or more processors can configure only the second switching circuit 115 (or both the first and the second switching circuits 115) to generate current for operations that require higher current but lower accuracy (e.g., cutting).

Additional features and components of system 100 will be described in reference to FIG. 5, which shows a flow diagram for a method 500 of providing an output current from a plasma arc system power supply comprising a plurality of autonomous switching circuits. In embodiments of system 100 employing method 500, the autonomous switching circuits 115 coordinate operation using a master-slave scheme, and initiate and coordinate current generation from power supply 105 without requiring interaction with or oversight from control processor circuit 110.

Based on a predetermined selection scheme, the microcontrollers of each of the plurality of autonomous switching circuits 115 select (505) a master microcontroller for coordinating operation of the plurality of autonomous switching circuits. In some embodiments, the selection scheme for determining the master microcontroller is based on values of the unique identifiers of the plurality of autonomous switching circuits 115. For example, a microcontroller can be configured to become the master microcontroller if its unique identifier is set to a predefined value, and to otherwise become a slave microcontroller. In some embodiments, the first microcontroller to take control of or "claim" the multi-node communications bus 220 upon startup of the plurality of autonomous switching circuits 115 is selected as the master microcontroller. In some embodiments, the microcontrollers of each of the plurality of autonomous switching circuits 115 advertise their capabilities (e.g., processing capabilities, enabled features, current output capacity, etc.) in a series of messages sent to one another, and the master microcontroller is selected based on a hierarchy of desirable capabilities (e.g., excess processing capacity is more desirable for the master microcontroller than a large current output capacity). In some embodiments, the predetermined selection scheme is based on one or more of the parameters described above.

The master microcontroller determines (510) one or more parameters for a process to be performed by the plasma arc system. For example, the master microcontroller can receive messages including data indicating an amount of output current required to be provided by power supply 105 for a cutting or marking process. In some embodiments, the master microcontroller receives data indicating a process that will be performed (e.g., cutting, marking) and properties of workpiece 145 (e.g., material composition, thickness), and the master microcontroller calculates an amount of output current required to perform the process. In some embodiments, the master microcontroller receives the one or more parameters over multi-node communications bus 220 from control processor circuit 110 or directly from a CNC. In some embodiments, the one or more parameters are provided to the master microcontroller by a user over a user interface of system 100, or via instrument settings of system 100 (e.g., dial settings).

The master microcontroller receives (515) from each of the other microcontrollers of the plurality of switching circuits 115, first one or more messages comprising at least one attribute of the switching circuits 115. For example, the master microcontroller can receive data from each slave microcontroller indicating the maximum output current capacity of each switching circuit 115. In some embodiments, the master microcontroller receives data from each slave microcontroller indicating one or more of the model number of each switching circuit 115 or a number of hours each autonomous switching circuit 115 has been operated.

The master microcontroller transmits (520) to each of the other microcontrollers of the plurality of switching circuits 115, second one or more messages comprising a current setpoint for each microcontroller, wherein each current setpoint is based on the at least one attribute of each autonomous switching circuit 115. The master microcontroller analyzes the at least one attribute of each switching circuit 115 in view of the one or more parameters of the process to be performed by the plasma arc system and determines a current setpoint for each switching circuit 115. For example, the master microcontroller determines a current setpoint for each switching circuit 115, including its own, such that the total current the switching circuits 115 will generate based on the current setpoints will meet the requirements of the process being performed by system 100. The master microcontroller then transmits the slave microcontrollers their particular current setpoint in messages passed over multi-node communications bus 120.

In response to receiving its current setpoint, each microcontroller operates in a similar manner to method 400, steps 415, 420 and 425 described above. The microcontrollers of each of the plurality of switching circuits 115 control (525) generation of a portion of an output current from the plasma arc system power supply based on the current setpoints. The microcontrollers of each of the plurality of switching circuits 115 monitor (530) one or more operating parameters of the autonomous switching circuits. The microcontrollers of each of the plurality of switching circuits 115 modify (535) a control parameter of the switching circuits 115 independent of and asynchronous to the other switching circuits 115 of the plurality of switching circuits 115 when one or more of the operating parameters exceeds a predetermined threshold.

In some embodiments, the microcontrollers preform an advanced load sharing scheme by which there is no master microcontroller and the switching circuits 115 divide the workload based on parameters such as heatsink temperature, arc hours operated, and even maximum output capability.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A plasma cutting system comprising:
a plasma torch comprising a head;
a housing; and
a power supply disposed within the housing and in communication with the plasma torch, the power supply configured to provide an output current for generating and maintaining a plasma cutting arc by the plasma torch, the power supply including:
one or more control processors; and
a plurality of autonomous switching circuits in communication with the one or more control processors via a multi-node communications bus, wherein each of the plurality of autonomous switching circuits comprises a unique identifier, each of the plurality of autonomous switching circuits including a microcontroller configured to:
control the generation of a portion of the output current based on one or more messages received from the one or more control processors;
monitor one or more operating parameters of the autonomous switching circuit; and
modify a control parameter of the autonomous switching circuit independent of and asynchronous to the other autonomous switching circuits of the plurality of autonomous switching circuits when one or more of the operating parameters exceeds a predetermined threshold,
wherein operation of an autonomous switching circuit of the plurality of autonomous switching circuits is enabled or disabled based on a value of its unique identifier.

2. The plasma cutting system of claim 1 further comprising a plurality of transmission line termination resistors connected between the plurality of autonomous switching circuits and the one or more control processors.

3. The plasma cutting system of claim 2 wherein the set of transmission line termination resistors is positioned at distal ends of the multi-node communications bus or at a common connection node of the multi-node communications bus.

4. The plasma cutting system of claim 1 further comprising a control board disposed within the housing, the control board comprising the one or more control processors and a connector associated with the multi-node communications bus.

5. The plasma cutting system of claim 1 wherein each microcontroller is a Digital Signal Processor (DSP).

6. The plasma cutting system of claim 1 wherein the multi-node communications bus comprises a multi-drop topology in which the one or more control processors are connected in parallel to the plurality of autonomous switching circuits.

7. The plasma cutting system of claim 1 wherein the one or more operating parameters comprise at least one of a DC voltage, a temperature of an autonomous switching circuit, and a current.

8. The plasma cutting system of claim 1 wherein each microcontroller is further configured to monitor the one or more operating parameters in real time.

9. The plasma cutting system of claim 1 wherein each microcontroller is further configured to:
detect one or more of a single-phase fault or an over-load current fault; and
modify a control parameter of the switching circuit independent of and asynchronous to the other autonomous switching circuits of the plurality of autonomous switching circuits based on the fault; and
provide an indication of the fault to the one or more control processors.

10. The plasma cutting system of claim 9 wherein the indication of the fault is provided to the one or more control processors in one or more messages transmitted via the multi-node communications bus.

11. The plasma cutting system of claim 1 wherein the multi-node communications bus is configured to support at least one of Controller Area Network (CAN) protocol, CANOpen protocol, Ethernet for Control Automation Technology (EtherCAT) protocol, DeviceNET protocol, or SERCOS protocol.

12. The plasma cutting system of claim 1 wherein the one or more control parameters comprise a frequency of a pulse wave modulated (PWM) signal, a duty cycle of a PWM signal, a timing signal for plasma arc ignition, and a shutdown signal.

13. The plasma cutting system of claim 1 wherein each of the plurality of autonomous switching circuits generates an equal portion of the output current.

14. The plasma cutting system of claim 1 wherein at least two of the plurality of autonomous switching circuits generate a different portion of the output current.

15. A plasma cutting system comprising:
a plasma torch comprising a head;
a housing; and
a power supply disposed within the housing and in communication with the plasma torch, the power supply configured to provide an output current for generating and maintaining a plasma cutting arc by the plasma torch, the power supply including:
one or more control processors; and
a plurality of autonomous switching circuits in communication with the one or more control processors via a multi-node communications bus, wherein each of the plurality of autonomous switching circuits comprises a unique identifier, each of the plurality of autonomous switching circuits including a microcontroller configured to:
  control the generation of a portion of the output current based on one or more messages received from the one or more control processors;
  monitor one or more operating parameters of the autonomous switching circuit; and
  modify a control parameter of the autonomous switching circuit independent of and asynchronous to the other autonomous switching circuits of the plurality of autonomous switching circuits when one or more of the operating parameters exceeds a predetermined threshold,
  wherein the unique identifier of an autonomous switching circuit of the plurality of autonomous switching circuits is based on one or more of (i) a physical location of the autonomous switching circuit within the housing, (ii) a key installed on the autonomous switching circuit, (iii) DIP switch settings, or (iv) one or more jumpers installed on the autonomous switching circuit.

16. A plasma cutting system comprising:
a plasma torch comprising a head;
a housing; and
a power supply disposed within the housing and in communication with the plasma torch, the power supply configured to provide an output current for generating and maintaining a plasma cutting arc by the plasma torch, the power supply including:
  one or more control processors; and
  a plurality of autonomous switching circuits in communication with the one or more control processors via a multi-node communications bus, each of the plurality of autonomous switching circuits including a microcontroller configured to:
    control the generation of a portion of the output current based on one or more messages received from the one or more control processors, wherein the one or more messages received from the one or more control processors comprise a setpoint for a current reference of the autonomous switching circuit;
    monitor one or more operating parameters of the autonomous switching circuit; and
    modify a control parameter of the autonomous switching circuit independent of and asynchronous to the other autonomous switching circuits of the plurality of autonomous switching circuits when one or more of the operating parameters exceeds a predetermined threshold.

17. The plasma cutting system of claim 16 wherein the setpoint corresponds to a profile relating gas pressure and time during one of a critical ramp-up period, a steady state period, or a ramp-down period.

18. A plasma cutting system comprising:
a plasma torch comprising a head;
a housing; and
a power supply disposed within the housing and in communication with the plasma torch, the power supply configured to provide an output current for generating and maintaining a plasma cutting arc by the plasma torch, the power supply including:
  one or more control processors; and
  a plurality of autonomous switching circuits in communication with the one or more control processors via a multi-node communications bus, each of the plurality of autonomous switching circuits including a microcontroller configured to:
    control the generation of a portion of the output current based on one or more messages received from the one or more control processors, wherein the portion of the output current generated by an autonomous switching circuit is based on one or more of a number of hours the autonomous switching circuit has been operated, a location of the autonomous switching circuit within the housing, a type of plasma cutting operation being performed by the plasma cutting system, a stage of a plasma cutting operation being performed by the plasma cutting system, and a current generation capability of the autonomous switching circuit;
    monitor one or more operating parameters of the autonomous switching circuit; and
    modify a control parameter of the autonomous switching circuit independent of and asynchronous to the other autonomous switching circuits of the plurality of autonomous switching circuits when one or more of the operating parameters exceeds a predetermined threshold.

* * * * *